(12) United States Patent
Lawson et al.

(10) Patent No.: US 7,640,963 B2
(45) Date of Patent: *Jan. 5, 2010

(54) TIRE/WHEEL BEAD ENTRAPMENT REMOVER

(75) Inventors: Lawrence J. Lawson, Troy, MI (US); Edwin Reece, Clarkston, MI (US); Robert Reece, Clarkston, MI (US)

(73) Assignee: Android Industries LLC, Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 12/113,325

(22) Filed: May 1, 2008

(65) Prior Publication Data

US 2008/0202697 A1 Aug. 28, 2008

Related U.S. Application Data

(63) Continuation of application No. 11/544,504, filed on Oct. 6, 2006, now Pat. No. 7,367,375.

(51) Int. Cl.
*B60C 25/132* (2006.01)
*B60C 25/00* (2006.01)

(52) U.S. Cl. .................. 157/1.17; 157/1.1

(58) Field of Classification Search ............. 157/1.1, 157/1.17, 1.28, 5
See application file for complete search history.

(56) References Cited

U.S. PATENT DOCUMENTS

| | | | |
|---|---|---|---|
| 2,762,424 A | 9/1956 | Zito | |
| 3,364,966 A | 1/1968 | Ebers | |
| 3,599,699 A | 8/1971 | Middleton, Jr. | |
| 3,599,700 A | 8/1971 | Cutillo et al. | |
| 3,665,995 A | 5/1972 | Middleton, Jr. | |
| 3,891,019 A | 6/1975 | Holladay | |
| 3,952,892 A | 4/1976 | Robinson et al. | |

(Continued)

FOREIGN PATENT DOCUMENTS

DE 3723767 1/1989

(Continued)

OTHER PUBLICATIONS

Supplementary European Search Resort EP06 82 5705 dated Oct. 7, 2009.

*Primary Examiner*—David B Thomas
(74) *Attorney, Agent, or Firm*—Honigman Miller Schwartz and Cohn LLP

(57) ABSTRACT

A tire/wheel bead entrapment remover is disclosed. The tire/wheel bead entrapment remover includes one or more working assemblies having a circumferential perimeter that substantially engages a tire. The one or more working assemblies axially-moves one of a wheel of the tire mounted to the wheel while axially-fixing the other of the tire or the wheel to remove one or more entrapments between a bead of the tire and a beat seat of the wheel. According to an embodiment, a tire/wheel bead entrapment remover includes one or more wheels that engages an outboard surface or an inboard surface of a tire mounted to a wheel. The radial axis extends through the one or more wheels. The radial axis traverses a radial line that radially extends from a common axis of rotation of the tire and the wheel. A method for removing an entrapment from a tire/wheel assembly is also disclosed.

17 Claims, 8 Drawing Sheets

U.S. PATENT DOCUMENTS

| | | |
|---|---|---|
| 4,516,617 A | 5/1985 | Seitz et al. |
| 4,563,975 A | 1/1986 | Kozlowski et al. |
| 4,610,287 A | 9/1986 | Rach et al. |
| 4,610,288 A | 9/1986 | Huinink et al. |
| 4,702,295 A | 10/1987 | Ewald et al. |
| 4,832,159 A | 5/1989 | Ikejima et al. |
| 4,886,101 A | 12/1989 | Kinnick et al. |
| 4,947,919 A | 8/1990 | Timlin |
| 4,964,299 A | 10/1990 | Maier et al. |
| 5,035,274 A | 7/1991 | Kinnick et al. |
| 5,339,880 A | 8/1994 | Kawabe et al. |
| 5,876,501 A | 3/1999 | Doan |
| 6,029,716 A | 2/2000 | Hawk |
| 6,076,586 A | 6/2000 | Hans et al. |
| 6,148,892 A | 11/2000 | Koerner et al. |
| 6,422,285 B1 | 7/2002 | Gonzaga et al. |
| 6,463,982 B1 | 10/2002 | Doan |
| 6,467,524 B2 | 10/2002 | Ronge et al. |
| 6,557,610 B2 | 5/2003 | Koerner et al. |
| 6,801,126 B2 | 10/2004 | Harm |
| 7,165,593 B2 | 1/2007 | Schmatz et al. |
| 7,367,375 B2 * | 5/2008 | Lawson et al. ............. 157/1.17 |
| 2002/0124971 A1 | 9/2002 | Koerner et al. |
| 2003/0150565 A1 | 8/2003 | Gonzaga |
| 2003/0221791 A1 | 12/2003 | Gonzaga |
| 2005/0000662 A1 | 1/2005 | Schmatz et al. |

FOREIGN PATENT DOCUMENTS

| | | |
|---|---|---|
| DE | 4006182 | 9/1990 |
| JP | 08175134 | 7/1996 |
| JP | 10217725 | 8/1998 |
| WO | WO-2006078784 A2 | 7/2006 |

* cited by examiner

TIRE/WHEEL BEAD ENTRAPMENT REMOVER

RELATED APPLICATION

This disclosure claims the benefit of Provisional Patent Application No. 60/724,194, filed on Oct. 6, 2005.

FIELD

The disclosure generally relates to devices for mounting, inflating, and balancing a tire relative a wheel and more particularly to automated systems for removing an entrapment between a tire bead and a bead seat of a wheel prior to balancing an inflated tire mounted to a wheel.

BACKGROUND

Tire/wheel assembly facilities may incorporate one or more automated tire/wheel assembly lines for preparing vehicle tires and vehicle wheels. This process typically involves, amongst other operations: (a) the mounting of a tire onto a wheel, (b) the inflating of the tire to the desired pressure, and (c) the balancing of the tire/wheel assembly.

Although automated tire/wheel assembling systems are known in the art, their use includes several drawbacks. One of these drawbacks includes their inability to flush entrapments, such as, for example, air bubble(s), lubricant, or the like, which may be microscopic in size, residing between a tire bead and a wheel bead seat when a tire is mounted to the wheel. Once the entrapment is present, it is factored into the balancing of the tire/wheel assembly. Subsequently, if the entrapment is bled out (e.g. during vehicle operation) the tire/wheel assembly may become imbalanced.

Accordingly, a need therefore exists for a device that removes entrapments, such as for example, air bubble(s), lubricant, or the like prior to balancing a tire/wheel assembly. As such, the present invention provides tire/wheel assemblies that may be balanced without entrapments, thereby increasing the potential that the tire/wheel assembly will not become imbalanced during normal operation of the vehicle.

BRIEF DESCRIPTION OF THE DRAWINGS

The present disclosure will now be described, by way of example, with reference to the accompanying drawings, in which.

DETAILED DESCRIPTION

A tire/wheel assembly is shown generally at 10 and a tire/wheel bead entrapment remover is shown generally at 100 and 200 in FIGS. 1A, 1B and 2A, 2B, respectively, according to an embodiment. Bead entrapment removers, in general, are also known in the art as "bead seaters" or "bead seating devices." As illustrated, the tire/wheel assembly 10 includes a tire 12 and a wheel 14 that are positioned on an assembly line cart 50.

Figure 1A:
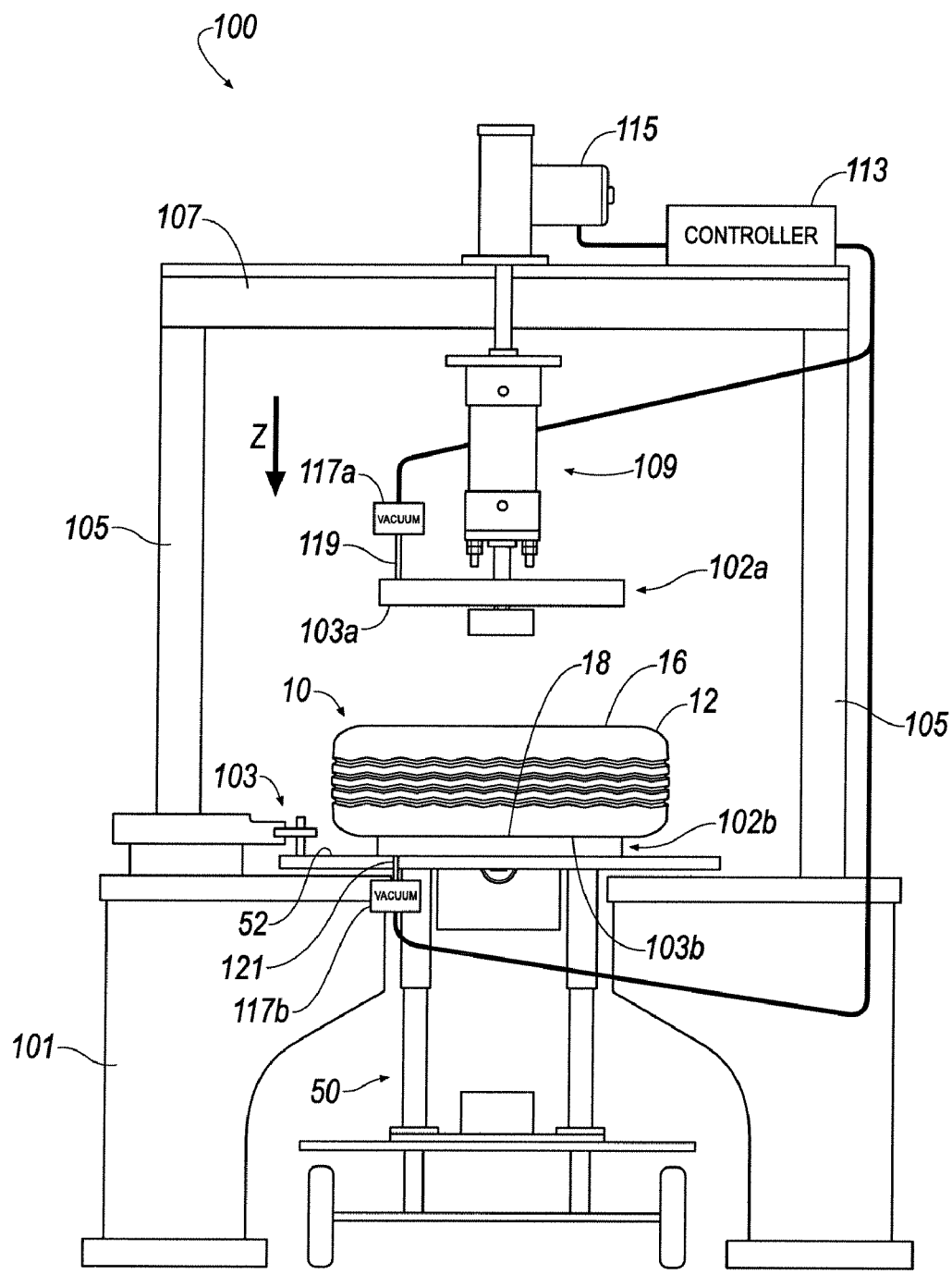
FIG. 1A is a front view of a tire/wheel assembly positioned on an assembly line cart that is located about a tire/wheel bead entrapment remover according to an embodiment.
Figure 1B:
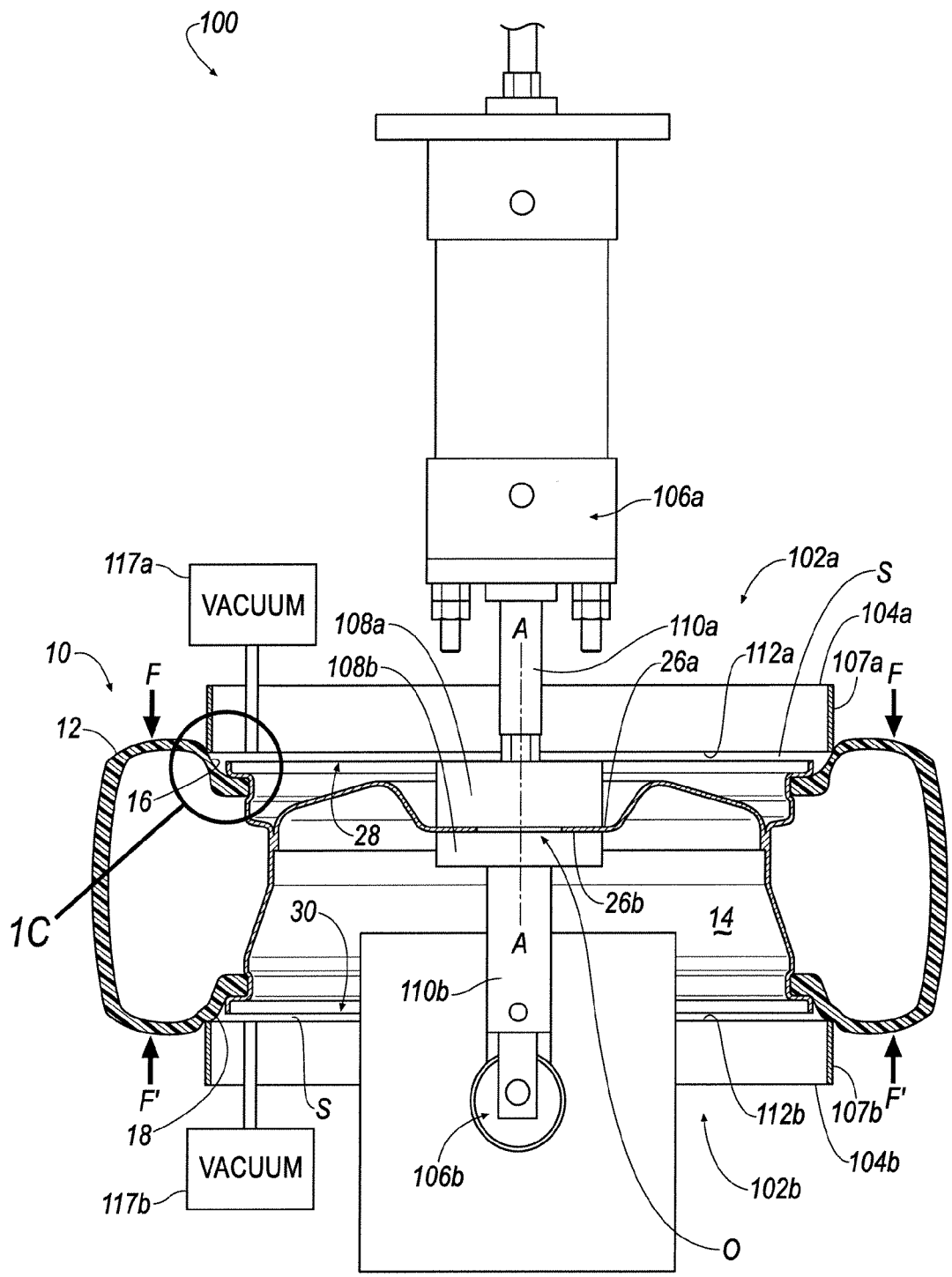
FIG. 1B is a partial cross-section view of the tire/wheel assembly and tire/wheel bead entrapment remover of FIG. 1A according to an embodiment.
Figure 2A:
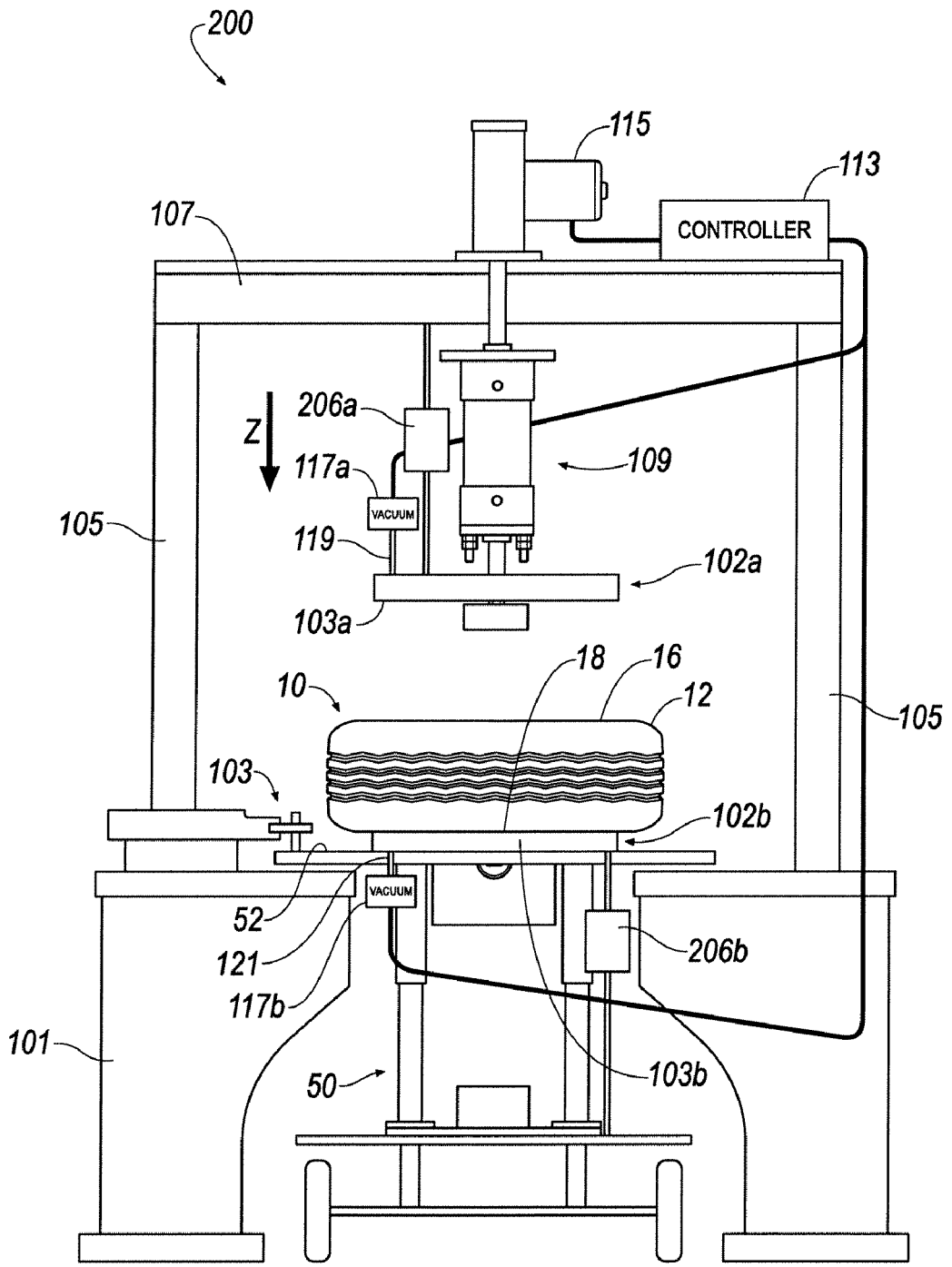
FIG. 2A is a front view of a tire/wheel assembly positioned on an assembly line cart that is located about a tire/wheel bead entrapment remover according to a second embodiment.

Referring to FIGS. 1A and 2A, the tire/wheel bead entrapment remover 100, 200 may include a base portion 101, a locking and retaining device 103 for locking and retaining the cart 50 to the base portion 101, a plurality of vertical support arms 105 extending from the base portion 101, a horizontal support portion 107 supported by the plurality of vertical support arms 105, a plunger portion 109 that adjusts the positioning of a first working assembly 102a relative the tire/wheel assembly 10, a controller 113, a motor 115 driven by the controller 113 to cause movement of the plunger portion 109, and a first vacuum device 117a driven by the controller 113 and connected by a hose 119 to the first working assembly 102a. The plunger portion 109 moves the first working assembly 102a from a disengaged position (FIGS. 1A, 2A) to an engaged position (FIGS. 1B, 2B) according to the direction of the arrow, Z, such that a circumferential perimeter 103a of the first working assembly 102a comes into contact with and engages an outboard circumferential perimeter surface 16 of the tire 12.

The tire/wheel bead entrapment remover 100, 200 also includes a second working assembly 102b positioned on a support surface 52 of the cart 50. As illustrated, an inboard circumferential perimeter surface 18 of the tire 12 is positioned on top of a circumferential perimeter 103b of the second working assembly 102b. The second working assembly 102b is attached to a second vacuum device 117b driven by the controller 113 and connected to the second working assembly 102b by a hose 121.

According to an embodiment, the working assemblies 102a, 102b are designed to circumferentially and, optionally, sealingly-engage the outboard and inboard surfaces 16, 18 of the tire 12 to remove any entrapments, such as, for example, microscopic air bubbles, B (FIG. 1C), that may be circumferentially entrapped in an area 20 proximate where an outboard/inboard tire bead 22 of the tire 12 is seated within an outboard/inboard bead seat 24 of the wheel 14.

Figure 1C:
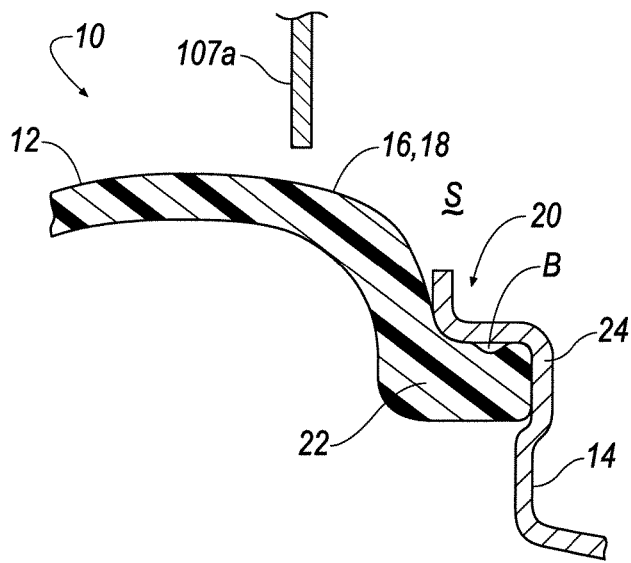
FIG. 1C is an enlarged view of the tire/wheel assembly according to line IC of FIG. 1B.

Referring now to FIG. 1B, the first and second working assemblies 102a, 102b respectively include a platen 104a, 104b, an oscillating motor 106a, 106b, and a hub engagement mechanism 108a, 108b. The oscillating motors 106a, 106b may be any type of motor, such as, for example, an electric motor, a hydraulic motor, a pneumatic motor, or the like that is designed to oscillate a working output shaft, press, clamp, or the like, which is shown generally at 110a, 110b. As illustrated, the working output shafts 110a, 110b are adapted to engage the hub mechanism 108a, 108b, which are effective, respectively, for providing forces according to the direction of arrows, F, F' from the working output shaft 110a, 110b to an outboard hub portion 26a, and an inboard hub portion 26b, respectively, of the wheel 14. If desired, the hub engagement mechanisms 108a, 108b and/or the shafts 110a, 110b may be joined together, through an opening, O, of the wheel 14 and one of the motors 106a, 106b.

According to the embodiment shown in FIGS. 1A, 1B, the outer peripheral portions 107 of platens 104a, 104b are designed to engage the outboard and inboard surfaces 16, 18, respectively, of the tire 12 to axially-fix (or confine) the positioning of the tire 12 from having any significant axial movement relative an axially-movable positioning of the wheel 14. While the tire 12 is restricted from any axial movement by outer peripheral portions 107 of the platens 104a, 104b, the hub engagement mechanisms 108a, 108c and/or working output shafts 110a, 110b are designed to clamp and axially-move the wheel 14 relative the tire 12.

Once the plunger portion 109 moves the first working assembly 102a to an engaged position as described above, the outer peripheral portions 107 of platens 104a, 104b circumferentially engage the outboard and inboard surfaces 16, 18 of time 12 while leaving a space S, between a facing surfaces 112a, 112b and an outermost circumferential periphery 28, 30 of the wheel 14. By leaving sufficient space S, axial movement of the wheel 14 relative the axially-fixed positioning of the platens 104a, 104b, as described below, will not result in contact between the platens 104a, 104b and the wheel 14.

According to an embodiment, the hub engagement mechanisms 108a, 108b are oscillated, respectively, according to the direction of arrows, F, F', in accordance with forces provided from one or more of the oscillating motors 106a, 106b, respectively. The forces, according to the direction of arrows, F, F', may be substantially parallel to an axis of rotation, A-A, of the tire/wheel assembly 10. Accordingly, the working output shafts 110a, 110b and/or hub engagement mechanisms 108a, 108b work on and axially-oscillate the positioning of the wheel 14 relative the axially-fixed positioning of the platens 104a, 104b that engage the outboard and inboard surfaces 16, 18 of the tire 12.

Figure 1D:
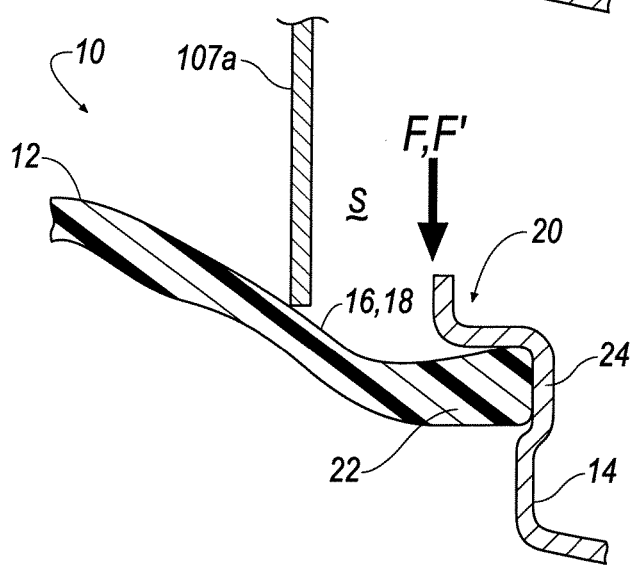
FIG. 1D is another enlarged view of the tire/wheel assembly according to FIG. 1C.

Referring to FIG. 1D, as a result of the forces applied to the wheel 14 according to the direction of the arrows, F, F', the wheel 14 is moved (relative to outer peripheral portion 107 of platens 104a, 104b) to cause the outboard/inboard tire bead 22 to be moved away from the outboard/inboard wheel bead seat 24. As a result, the forces applied in the direction of the arrows, F, F', entrapments, such as, for example, microscopic air bubbles, B (FIG. 3), may be released. Accordingly, the tire/wheel entrapment remover 100 is effective for removing any entrapments, B, between the outboard/inboard tire bead 22 and the outboard/inboard beat seat 24 prior to balancing the tire/wheel assembly 10.

Figure 2B:
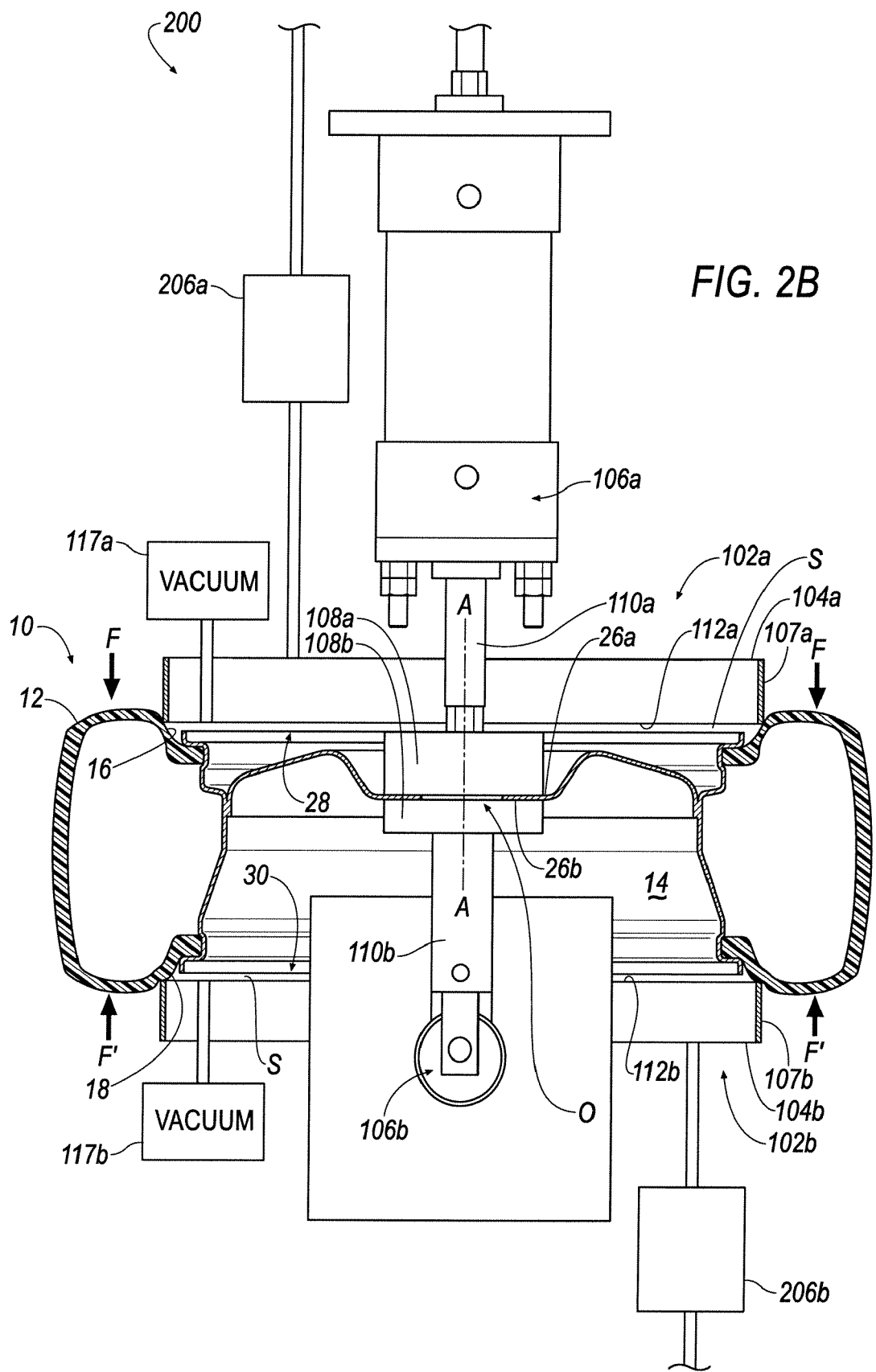
FIG. 2B is a partial cross-section view of the tire/wheel assembly and the tire/wheel bead entrapment remover of FIG. 2A according to an embodiment.

Referring now to FIG. 2B, another embodiment is disclosed. According to the embodiment, the first and second working assemblies 102a, 102b respectively include a platen 104a, 104b, a platen moving device 206a, 206b, and a hub engagement mechanism 108a, 108b. The tire/wheel bead entrapment remover 200 also includes working output shafts 110a, 110b that are adapted to engage the hub mechanism 108a, 108b. The platen moving device 206a, 206b may include an electric motor, a hydraulic motor, a pneumatic motor, or the like.

The hub engagement mechanisms 108a, 108b and working output shafts 110a, 110b are designed to clamp and hold the wheel 14 in an axially-fixed position as the platens 104a, 104b are designed to engage and axially-move the positioning of the tire 12 relative the axially-fixed positioning of the wheel 14. Accordingly, once the plunger portion 109 moves the first working assembly 102a to an engaged position as described above, the outer peripheral portions 107 of platens 104a, 104b circumferentially engage the outboard and inboard surfaces 16, 18 of the tire 12 while leaving a space S, between a facing surface 112a, 112b of each respective platen 104a, 104b and an outermost circumferential periphery 26, 28 of the wheel 14. By leaving space S, axial movement of the platens 104a, 104b and tire 12 relative the axially-fixed positioning of the wheel 14, as described below, will not result in contact between the platens 104a, 104b and the wheel 14.

According to an embodiment, the platens 104a, 104b are axially-moved (e.g. axially-oscillated) according to the direction of arrows, F, F', in accordance with forces provided from the platen moving devices 206a, 206B, respectively. The forces according to the direction of the arrows, F, F', may be substantially parallel to an axis of rotation, A-A, of the tire/wheel assembly 10. Accordingly, axial movement of the platens 104a, 104b work on and axially-move/axially-oscillate the positioning of the tire 12 relative the axially-fixed positioning of the wheel 14.

Referring to FIG. 1D, the forces according to the direction of the arrows, F, F', are applied by way of outer peripheral portions 107 of platens 104a, 104b to axially-move the tire 12 to result in the outboard/inboard tire bead 22 being axially-moved away from the axially-fixed wheel bead seat 24 of the wheel 14. As a result, the forces applied in the direction of the arrows, F, F', to the tire 12 causes the area 20, which may include entrapments, such as, for example, air bubbles, B, to be released. Accordingly, the tire/wheel entrapment remover 200 removes any entrapments, B, between the outboard/inboard tire bead 22 and the outboard/inboard beat seat 24 prior to balancing the tire/wheel assembly 10.

Accordingly, because of the relative movement caused between tire 12 and wheel 14, contact between the tire bead 22 and the wheel bead seat 24 is interrupted. This interruption primarily is characterized by portions of the outboard/inboard tire bead 22 being temporarily pulled away from the seating surface of outboard/inboard wheel bead seat 24. By axially moving the tire 12 or wheel 14 while holding the other in an axially-fixed relationship in this way, any entrapments, such as, for example, air bubbles, B, that may be entrapped between the tire bead 22 and the wheel bead seat 24 is/are released.

Figure 1E:
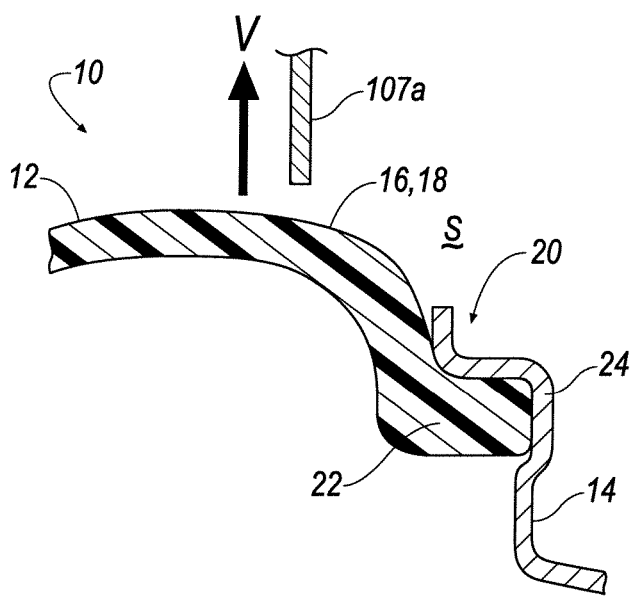
FIG. 1E is another enlarged view of the tire/wheel assembly according to FIG. 1D.

According to an embodiment, the first and/or second vacuum devices 117a, 117b may be activated when the tire 12 or wheel 14 is axially-moved as described above. As seen in FIG. 1E, a vacuum, V, may be applied by the first and/or second vacuum devices 117a, 117b to aid in the evacuation of entrapments, such as, for example, air bubble(s), B, lubricants, contaminants, or the like. Additionally, the vacuum, V, may assist in the positive seating of the tire bead 22 in the wheel bead seat 24 prior to balancing the tire/wheel assembly 10. It will be appreciated that by applying the vacuum, V, in the chamber defined by the platens (surfaces 112a, 112b) and the tire 12, any entrapped air, lubricant, or contaminants between the tire 12 and the facing surface 112a, 112b of each respective platen 104a, 104b may be more easily evacuated than in the case where no vacuum, V, is applied.

Figure 3:
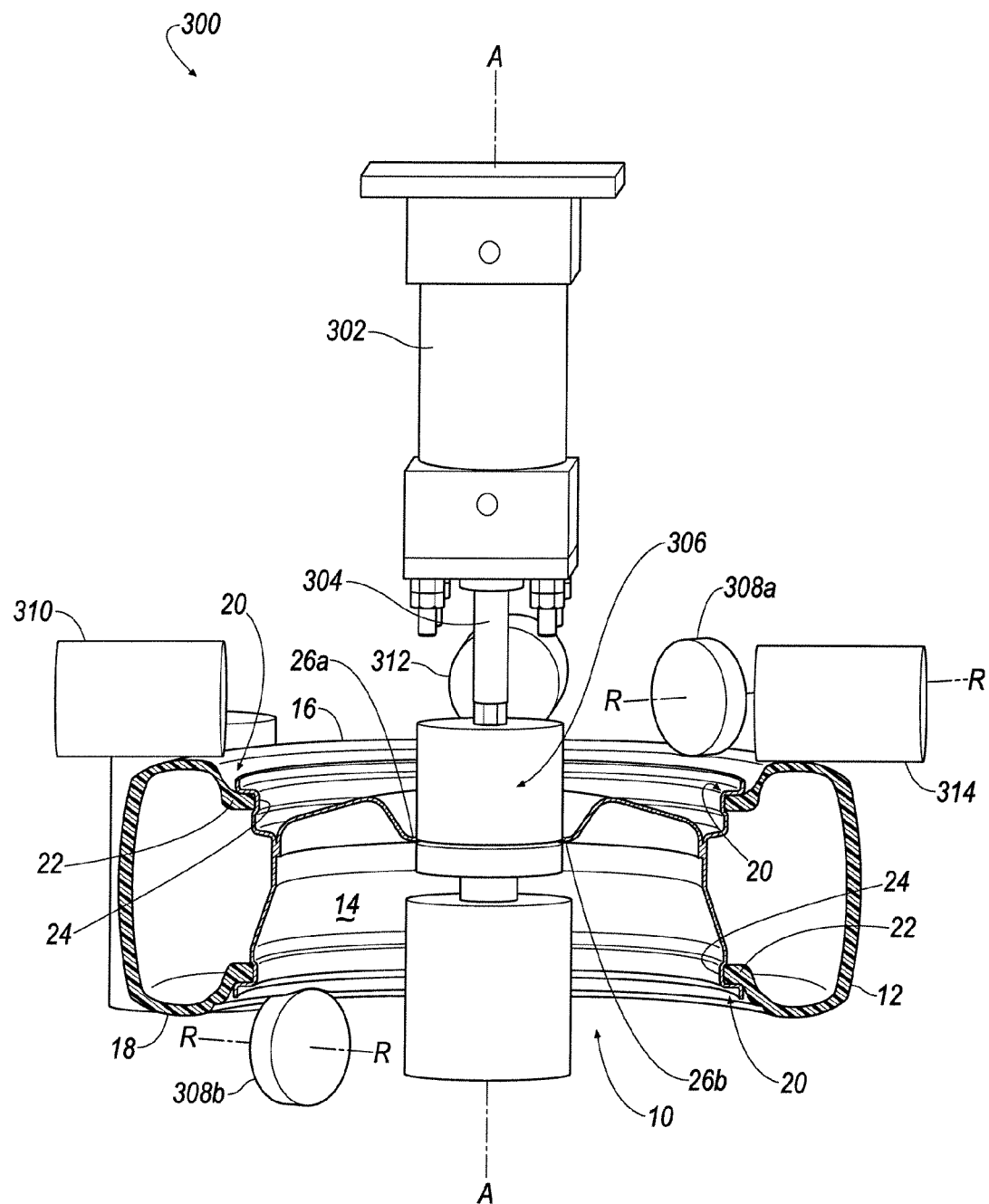
FIG. 3 is a perspective, partial cross-sectional view of a tire/wheel assembly and a tire/wheel bead entrapment remover according to a third embodiment.

Referring now to FIG. 3, a tire/wheel bead entrapment remover is shown generally at 300 according to an embodiment. The tire/wheel bead entrapment remover 300 generally includes a rotary motor 302, a rotary output shaft 304, and a hub engagement mechanism 306. The hub engagement mechanism 306 is effective for connecting the rotary output shaft 304 to the outboard and inboard hub portions 26a, 26b of the wheel 14.

The tire/wheel bead entrapment remover 300 also includes at least one kneading wheel 308a, 308b. As illustrated, the kneading wheel 308a engages the outboard surface 16 of the tire 12, and the kneading wheel 308b engages the inboard surface 18 of the tire 12. The kneading wheels 308a, 308b are manipulated to engage the outboard and inboard surfaces 16, 18, respectively, of the tire 12 generally proximate the area 20 that defines the region of the tire bead 22 and wheel bead seat 24.

Figure 4A:
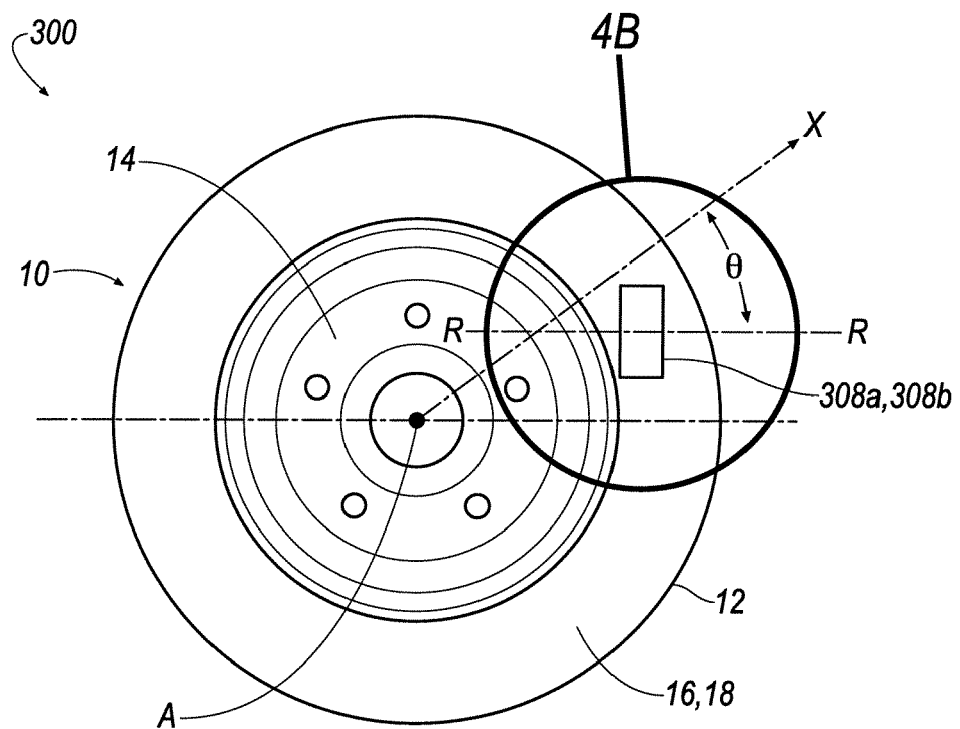
FIG. 4A is a top view of the tire/wheel assembly and the tire/wheel bead entrapment remover of FIG. 3 according to an embodiment.

As illustrated in FIGS. 3 and 4A, a radial axis, R-R, extends through the kneading wheels 308a, 308b and defines the axis of rotation of wheels 308a, 308b. An axle (not shown) may be aligned with the radial axis, R-R. As illustrated, the radial axis, R-R, traverses a radial line, X, which is shown radially extending from the axis of rotation, A-A, of the tire/wheel assembly 10 (FIG. 4A).

According to an embodiment, the radial axis, R-R, is substantially misaligned with the radial line, X, and does not pass through the axis of rotation, A-A. By radially misaligning radial axis, R-R, with the radial line, X, the intersection of the radial axis, R-R, and the radial line, X, creates an offset angle, $\theta$.

Figure 4B:
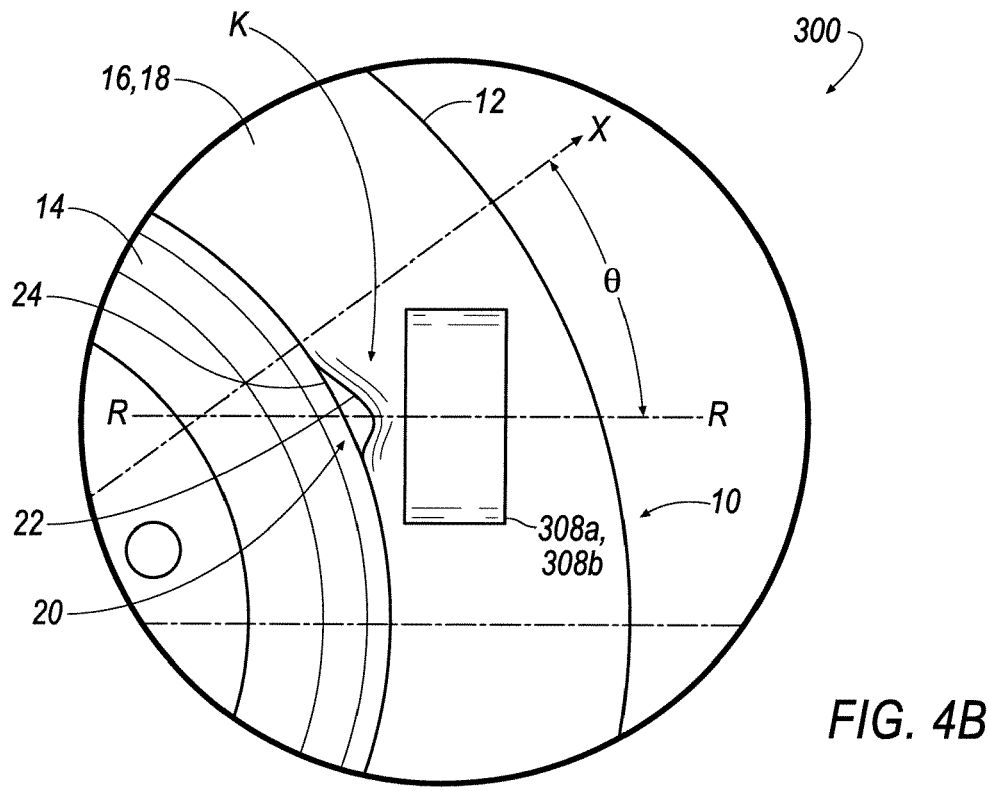
FIG. 4B is an enlarged top view of the tire/wheel assembly and the tire/wheel bead entrapment remover of FIG. 4A according to encircled portion 4B.

Accordingly, as seen in FIG. 4B, by setting the radial axis, R-R, of the kneading wheel 308a, 308b in the manner described above, when tire/wheel assembly 10 is rotated by the rotary motor 302, the kneading wheel 308a, 308b provides a pulling or "kneading" effect, K, on the outboard and inboard surface 16, 18 of the tire 12 proximate the region 20 bounded between the kneading wheel 308a, 308b and tire bead. By kneading, K, the outboard and inboard surface 16, 18 of the tire 12 in this way during rotation of the tire/wheel assembly 10, the interface surfaces between the tire bead 22 and the wheel bead seat 24 is temporarily disrupted, thereby releasing any entrapments, such as, for example, air bubbles, B, therebetween. Although not illustrated, vacuums 117a, 117b may be included as shown in FIGS. 1A, 1B and 2A, 2B to aid in the removal of lubricants, contaminants, or the like in the area 20. Thus, the tire/wheel entrapment remover 300 removes any entrapments between the outboard/inboard tire bead 22 and the outboard/inboard beat seat 24 prior to balancing the tire/wheel assembly 10.

Figure 5A:
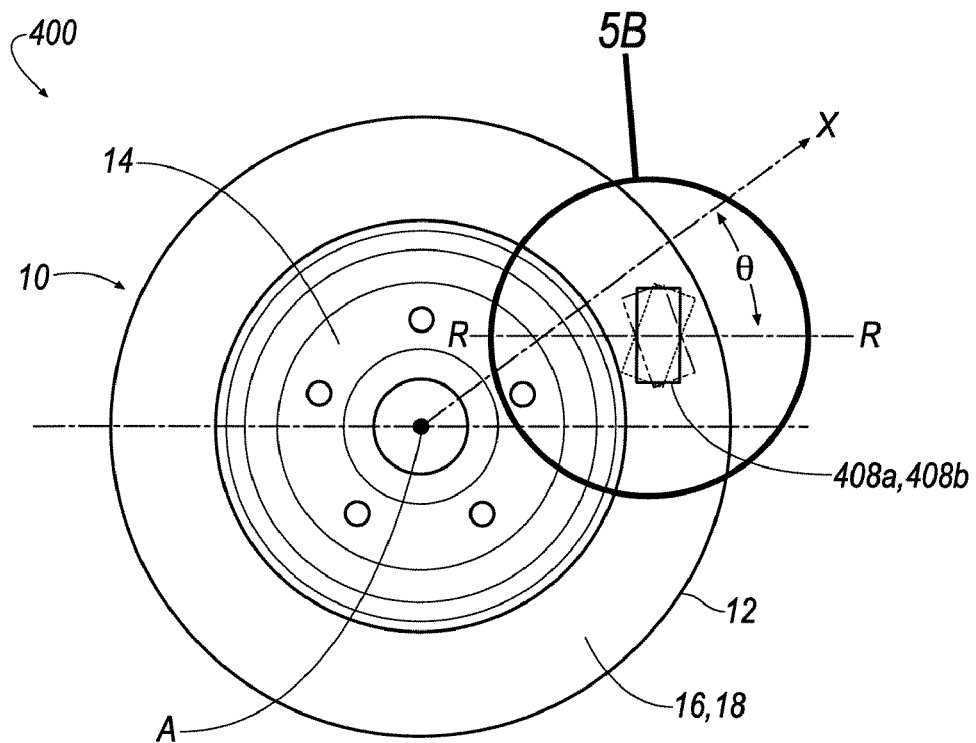
FIG. 5A is a top view of the tire/wheel assembly and a tire/wheel bead entrapment remover according to a fourth embodiment.
Figure 5B:
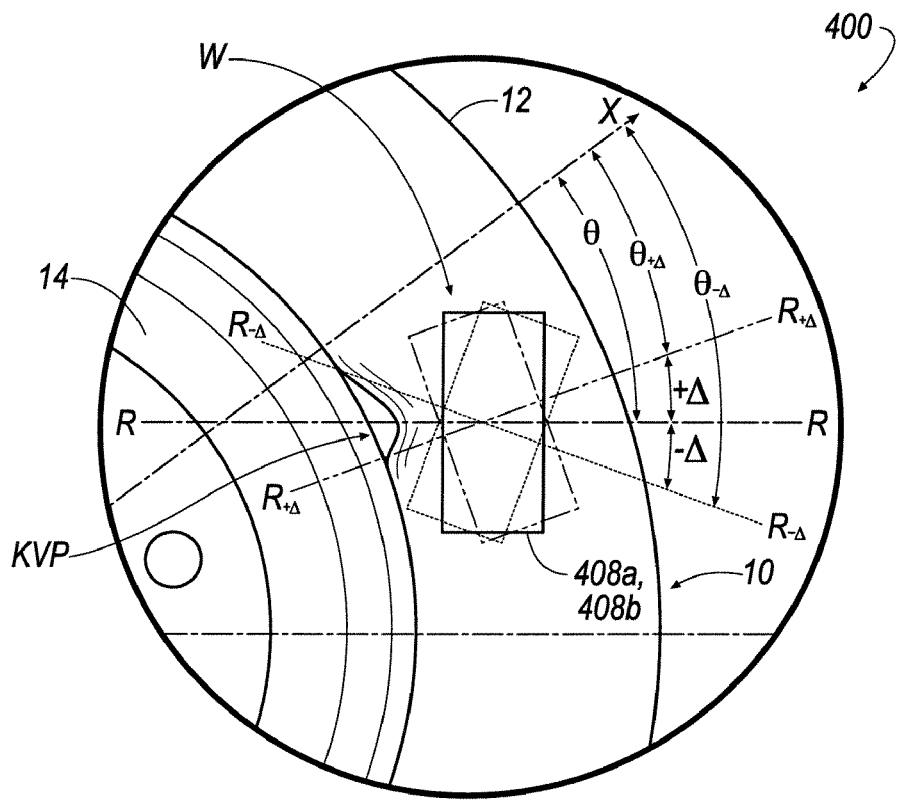
FIG. 5B is an enlarged top view of the tire/wheel assembly and the tire/wheel bead entrapment remover of FIG. 5A according to encircled portion 5B.

In an alternative embodiment as shown in FIGS. 5A and 5B, a tire/wheel bead entrapment remover is shown generally at 400 according to an embodiment. The tire/wheel bead entrapment remover 400 is substantially the same as that shown and described in FIGS. 3-4B except that the wheel, which is shown generally at 408a, 408b includes additional functionality and, in this embodiment, is referred to a wobble-wheel.

The wobble-wheel 408a, 408b is not snuggly fit to the radial axis, R-R, but rather, the wobble-wheel 408a, 408b is loosely-fitted about the radial axis, R-R. By loosely-fitting the wobble-wheel 408a, 408b relative the radial axis, R-R, the wobble-wheel 408b, 408b is allowed to "wander" or "wobble" and deviate angularly +/−between bounds defined by deviation angle, $+\Delta$, $-\Delta$ (FIG. 5B), relative to angle, $\theta$. A tire/wheel assembly 10 is rotated by rotary motor 302, wobble wheel 408a, 408b not only rotates about axis R-R (as described in conjunction with FIGS. 4A and 4B), it also wobbles between $+/-\Delta$. The deviation angle, $+\Delta$, shifts the radial axis from that shown at, R-R, to a radial axis, $R_{+\Delta}$-$R_{+\Delta}$, that correlates to an angle, $\theta_{+\Delta}$. The deviation angle, $-\Delta$, shifts the radial axis from that shown at, R-R, to a radial axis, $R_{-\Delta}$-$R_{-\Delta}$, that correlates to an angle, $\theta_{-\Delta}$.

Accordingly, the wobbling effect, W, will introduce, in addition to kneading action, a dynamic vibration, pulling, and other disruptive forces, which is shown generally at KVP. The kneading, vibration, and pulling force, KVP, would otherwise not be present if wobble wheel 408a, 408b was tightly affixed to the radial axis, R-R, as shown and described in FIGS. 3-4B. Although the deviation angle, $+\Delta$, $-\Delta$, permits the radial axis, R-R, to the radial axis, $R_{+\Delta}$-$R_{+\Delta}$ or $R_{-\Delta}$-$R_{-\Delta}$, to change its orientation relative the radial line, X, it will be appreciated that the deviation angle, $+\Delta$, $-\Delta$, may be controlled to not permit the radial axis, $R_{+\Delta}$-$R_{+\Delta}$ or $R_{-\Delta}$-$R_{-\Delta}$, to pass through the axis of rotation, A-A.

By providing the disruptive forces, FVP, associated with the wobbling effect, W, the outboard and inboard surface 16, 18 of the tire 12, during rotation of the tire/wheel assembly 10, temporarily disrupts the interface between the tire bead 22 and the wheel bead seat 24, thereby releasing any entrapments, such as, for example, air bubbles, B, therebetween. Although not illustrated, vacuum sources 117a, 117b may be included as shown in FIGS. 1A, 1B and 2A, 2B to remove lubricants, contaminants, or the like in the area 20. Thus, the tire/wheel entrapment remover 400 removes entrapments between the outboard/inboard tire bead 22 and the outboard/inboard beat seat 24 prior to balancing the tire/wheel assembly 10.

According to an embodiment, the tire/wheel bead entrapment removers 300, 400 may include optional rollers 310, 312, 314 that can be used to steady the overall movement of tire/wheel assembly 10 during rotation. Additionally, according to an embodiment, the rollers 310, 312, 314 can be attached to a drive motor and can be used to rotate tire/wheel assembly 10. Although the rollers 310, 312, 314 are shown engaging the outboard surface 16 of the tire 12, it will be appreciated that rollers 310, 312, 314 may be applied alone or in combination proximate the inboard surface 18 of the tire 12.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method for processing an inflated tire-wheel assembly including one or more entrapments disposed proximate one or more beads of a tire seated within one or more bead seats of a wheel, comprising the steps of:
    axially-moving one of the tire and wheel while
    axially-fixing the other of the tire and wheel for
        temporarily disrupting said one or more beads seated within said one or more bead seats, and
        removing the one or more entrapments proximate the one or more beads and one or more bead seats.

2. The method according to claim 1, wherein the removing step further comprising the step of:
    applying a vacuum proximate the one or more beads and one or more bead seats.

3. The method according to claim 2, wherein, prior to the applying a vacuum step, further comprising the steps of:

sealingly-disposing at least one working assembly adjacent at least one outer surface of the tire for defining one or more chambers; and applying said vacuum to the one or more chambers.

4. The method according to claim 1, wherein the axially-moving and axially-fixing steps are further defined by:

axially-fixing the tire about an axis; and axially-moving the wheel about the axis.

5. The method according to claim 1, wherein the axially-moving and axially-fixing steps are further defined by:

axially-fixing the wheel about an axis; and axially-moving the tire about the axis.

6. An apparatus for processing an inflated tire-wheel assembly including one or more entrapments disposed proximate one or more beads of a tire seated within one or more bead seats of a wheel, comprising:

means for axially-moving one of the tire and wheel while axially-fixing the other of the tire and wheel for temporarily disrupting said one or more beads seated within said one or more bead seats, and removing the one or more entrapments proximate the one or more beads and one or inure head seats; and at least one working assembly connected to said means.

7. The apparatus according to claim 6, wherein the means includes:

at least one an oscillating motor, wherein the at least one oscillating motor is connected to the at least one working assembly.

8. The apparatus according to claim 6, wherein the at least one working assembly is disposed adjacent at least one outer surface of the tire to define one or more chambers, wherein the apparatus father comprises:

means for applying a vacuum to the one or more chambers.

9. The apparatus according to claim 8, wherein the means for applying a vacuum includes:

at least one vacuum apparatus connected to the at least one working assembly.

10. A method for processing an inflated tire-wheel assembly including one or more entrapments disposed proximate one or more beads of a tire seated within one or more bead seats of a wheel, comprising the steps of:

disposing one or more kneading devices adjacent one or more outer surfaces of the lire; and kneading a portion of the one or more outer surfaces of the tire with the one or more kneading devices for temporarily disrupting said one or more beads seated within said one or more bead seats, and removing the one or more entrapments proximate the one or more beads and one or more bead seats.

11. The method according to claim 10, wherein the one or more kneading devices includes one or more kneading wheels, wherein a kneading wheel axis of rotation extends through each of the one or more kneading wheels, wherein the kneading step further comprises the step of:

permitting one or mare of the kneading wheel axes of rotation of each of the one or more kneading wheels to angularly deviate for permissively-wobbling the one or more kneading wheels.

12. The method according to claim 10 further comprising the step of:

rotating the tire-wheel assembly about a tire-wheel assembly axis of rotation.

13. The method according to claim 12, wherein the kneading step is responsive to the rotating step.

14. An apparatus for processing an inflated tire-wheel assembly including one or more entrapments disposed proximate one or more beads of a tire seated within one or more bead seats of a wheel, comprising:

a rotary output shaft connected to the wheel; and means for kneading a portion of one or more outer surfaces of the tire for temporarily disrupting said one or more beads seated within said one or more bead seats, and removing the one or mare entrapments proximate the one or more beads and one or more bead seats.

15. The apparatus according to claim 14, wherein the means includes:

one or more kneading wheels disposed adjacent said one or more outer surfaces of the tire, wherein a kneading wheel axis of rotation extends through each of the one or more kneading wheels.

16. The apparatus according to claim 15, wherein the means further includes permitting one or more of the kneading wheel axes of rotation of each of the one or more kneading wheels to angularly deviate for the purpose of:

permissively-wobbling the one or more kneading wheels.

17. The apparatus according to claim 14, wherein the rotary output shaft provides:

means for rotating the tire-wheel assembly about a tire-wheel assembly axis of rotation.

* * * * *

UNITED STATES PATENT AND TRADEMARK OFFICE
CERTIFICATE OF CORRECTION

| | | |
|---|---|---|
| PATENT NO. | : 7,640,963 B2 | Page 1 of 1 |
| APPLICATION NO. | : 12/113325 | |
| DATED | : January 5, 2010 | |
| INVENTOR(S) | : Lawrence J. Lawson et al. | |

It is certified that error appears in the above-identified patent and that said Letters Patent is hereby corrected as shown below:

In the Claims:

Col. 7, line number 25, please change "inure" to --more--;

Col. 7, line number 35, please change "father" to --further--;

Col. 7, line number 47, please change "lire" to --tire--;

Col. 8, line number 10, please change "mare" to --more--;

Col. 8, line number 31, please change "mare" to --more--.

Signed and Sealed this

Thirtieth Day of March, 2010

David J. Kappos
*Director of the United States Patent and Trademark Office*